(12) United States Patent
Lucas et al.

(10) Patent No.: US 10,992,746 B2
(45) Date of Patent: *Apr. 27, 2021

(54) AUTOMATIC SYSTEM RESPONSE TO EXTERNAL FIELD-REPLACEABLE UNIT (FRU) PROCESS

(71) Applicant: Microsoft Technology Licensing, LLC, Redmond, WA (US)

(72) Inventors: Shawn Lucas, Bellevue, WA (US); Cheng Wei, Bellevue, WA (US); Rahim Maknojia, Redmond, WA (US); Robert S. T. Gibson, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,791

(22) Filed: Jun. 10, 2019

(65) Prior Publication Data

US 2019/0297141 A1    Sep. 26, 2019

Related U.S. Application Data

(63) Continuation of application No. 15/148,528, filed on May 6, 2016, now Pat. No. 10,320,897.

(Continued)

(51) Int. Cl.
*G06F 15/177* (2006.01)
*H04L 29/08* (2006.01)
(Continued)

(52) U.S. Cl.
CPC .......... *H04L 67/1031* (2013.01); *G06F 8/61* (2013.01); *G06F 9/5072* (2013.01);
(Continued)

(58) Field of Classification Search
CPC . H04L 67/1031; H04L 67/24; H04L 41/0809; H04L 41/0886; G06F 8/61; G06F 2209/505
(Continued)

(56) References Cited

U.S. PATENT DOCUMENTS 7,145,898 B1 * 12/2006 Elliott .................... H04L 12/66
                                                    370/352
7,761,591 B2 * 7/2010 Graham ................. G06Q 40/02
                                                    709/233

(Continued)

FOREIGN PATENT DOCUMENTS

CN        102006333 A        4/2011
CN        102012808 A        4/2011

OTHER PUBLICATIONS

"First Office Action and Search Report Issued in Chinese Patent Application No. 201680071508.8", dated Nov. 2, 2020, 21 Pages.

*Primary Examiner* — Thu Ha T Nguyen
(74) *Attorney, Agent, or Firm* — Alleman Hall Creasman & Tuttle LLP (57) ABSTRACT

System management services can discover the addition of new physical devices, take automated actions to provision software (operating system and other related cloud services software components) on them, and scale out management infrastructure based on the new capacity of the total resources (including the newly added resources). A configuration file can contain the rules for automatic expansion and contraction of the system.

20 Claims, 10 Drawing Sheets

Related U.S. Application Data (60) Provisional application No. 62/267,568, filed on Dec. 15, 2015.

(51) Int. Cl.
*G06F 8/61* (2018.01)
*G06F 9/50* (2006.01)
*H04L 12/24* (2006.01)

(52) U.S. Cl.
CPC ...... *H04L 41/0809* (2013.01); *H04L 41/0886* (2013.01); *H04L 67/24* (2013.01); *G06F 2209/505* (2013.01)

(58) Field of Classification Search
USPC .................................. 709/221, 222, 220
See application file for complete search history.

(56) References Cited

U.S. PATENT DOCUMENTS

| | | | | |
|---|---|---|---|---|
| 7,793,136 | B2* | 9/2010 | Lutter | G01S 19/37 |
| | | | | 714/1 |
| 8,758,111 | B2* | 6/2014 | Lutnick | G07F 17/32 |
| | | | | 463/16 |
| 9,195,784 | B2* | 11/2015 | Tseng | G06F 30/331 |
| 9,954,794 | B2* | 4/2018 | Cheng | H04L 29/06 |
| 10,037,689 | B2* | 7/2018 | Taylor | G08G 1/096775 |
| 10,075,334 | B1* | 9/2018 | Kozura | H04W 12/0806 |
| 10,225,157 | B2* | 3/2019 | Cordray | H04L 41/20 |
| 10,326,676 | B1* | 6/2019 | Driggs | H04L 43/0876 |
| 10,397,013 | B1* | 8/2019 | Hill | H04L 67/306 |
| 10,452,440 | B1* | 10/2019 | Odulinski | G06F 9/485 |
| 2002/0029200 | A1* | 3/2002 | Dulin | G06Q 20/02 |
| | | | | 705/67 |
| 2002/0116485 | A1* | 8/2002 | Black | H04L 63/083 |
| | | | | 709/223 |
| 2002/0165961 | A1* | 11/2002 | Everdell | H04L 41/22 |
| | | | | 709/225 |
| 2003/0120822 | A1* | 6/2003 | Langrind | H04L 61/2092 |
| | | | | 709/251 |
| 2003/0126195 | A1* | 7/2003 | Reynolds | G06F 11/2023 |
| | | | | 709/203 |
| 2004/0186903 | A1* | 9/2004 | Lambertz | H04L 41/22 |
| | | | | 709/224 |
| 2005/0198247 | A1* | 9/2005 | Perry | H04L 7/0008 |
| | | | | 709/223 |
| 2007/0033419 | A1* | 2/2007 | Kocher | G06F 9/445 |
| | | | | 713/193 |
| 2009/0093300 | A1* | 4/2009 | Lutnick | G07F 17/3293 |
| | | | | 463/26 |
| 2010/0070100 | A1* | 3/2010 | Finlinson | H04Q 9/00 |
| | | | | 700/295 |
| 2010/0094981 | A1* | 4/2010 | Cordray | H04L 41/082 |
| | | | | 709/222 |
| 2010/0312433 | A1* | 12/2010 | Preston | H04L 12/403 |
| | | | | 701/36 |
| 2011/0119556 | A1* | 5/2011 | de Buen | H04L 41/12 |
| | | | | 714/758 |
| 2011/0167250 | A1* | 7/2011 | Dicks | G16H 40/67 |
| | | | | 713/2 |
| 2011/0179405 | A1* | 7/2011 | Dicks | G16H 40/67 |
| | | | | 717/168 |
| 2012/0036442 | A1* | 2/2012 | Dare | G06F 8/60 |
| | | | | 715/736 |
| 2012/0036552 | A1* | 2/2012 | Dare | H04L 41/0803 |
| | | | | 726/1 |
| 2012/0126790 | A1* | 5/2012 | Sobotka | G08C 19/28 |
| | | | | 324/119 |
| 2012/0278606 | A1* | 11/2012 | Huang | H04L 63/062 |
| | | | | 713/2 |
| 2014/0173060 | A1* | 6/2014 | Jubran | G06F 9/5072 |
| | | | | 709/220 |
| 2014/0214516 | A1* | 7/2014 | Genschel | B60L 53/65 |
| | | | | 705/14.27 |
| 2014/0280829 | A1* | 9/2014 | Kjendal | H04L 43/028 |
| | | | | 709/223 |
| 2014/0282586 | A1* | 9/2014 | Shear | G06F 16/248 |
| | | | | 718/104 |
| 2014/0297799 | A1* | 10/2014 | Gordon | H04L 65/608 |
| | | | | 709/217 |
| 2015/0339107 | A1* | 11/2015 | Krishnamurthy | G06F 8/20 |
| | | | | 717/107 |
| 2015/0365288 | A1* | 12/2015 | Van Der Merwe | G06Q 10/06 |
| | | | | 370/254 |
| 2016/0195856 | A1* | 7/2016 | Spero | G05B 15/02 |
| | | | | 700/90 |
| 2016/0232010 | A1* | 8/2016 | Dicks | G06F 8/654 |
| 2017/0147297 | A1* | 5/2017 | Krishnamurthy | G06F 8/34 |
| 2018/0180465 | A1* | 6/2018 | Papanagiotou | G08B 21/182 |
| 2018/0349221 | A1* | 12/2018 | Harutyunyan | G06F 11/0754 |
| 2019/0121978 | A1* | 4/2019 | Kraemer | G06F 21/566 |
| 2019/0178680 | A1* | 6/2019 | Kriss | G06Q 10/08 |
| 2019/0334909 | A1* | 10/2019 | Schmitt | G06F 3/0659 |
| 2019/0364492 | A1* | 11/2019 | Azizi | H04W 68/005 |

\* cited by examiner

```xml
<AutomaticScaleOptions>
<Option PriorityIndex="1" >
    <Conditions>
        <Condition Type="Number" NumberOfComputeNodes="32" NumberOfStorageNodes="4" NumberOfHyperConvergedNodes="" />
        <Condition Type="Capacity" TotalMemory="" TotalProcs="" TotalStorage="" />
        <Condition Type="Advance" module="" function=""/>
    </Conditions>
    <DesiredConfiguration>
        <NumberOfNodes Count="2" />
        <NodeConfiguration Memory="8GB" ProcessorCount="4" DynamicMemory="false" />
    </DesiredConfiguration>
</Option>
<Option PriorityIndex="2" >
    <Conditions>
        <Condition Type="Number" NumberOfComputeNodes="4" NumberOfStorageNodes="4" NumberOfHyperConvergedNodes="" />
        <Condition Type="Capacity" TotalMemory="" TotalProcs="" TotalStorage="" />
        <Condition Type="Advance" module="" function=""/>
    </Conditions>
    <DesiredConfiguration>
        <NumberOfNodes Count="1" />
        <NodeConfiguration Memory="8GB" ProcessorCount="4" DynamicMemory="false" />
    </DesiredConfiguration>
</Option>
</AutomaticScaleOptions>
```

FIG. 7

```xml
<Action Type="Deployment">
    <Steps>
      <Step index="1" >
        <Roles>
          <Role name="PhysicalNodes" InterfaceType="deployment" />
        </Roles>
      </Step>
      <Step index="2" >
        <Roles>
          <Role name="cloud\Physicalinfra\VirtualMachine" InterfaceType="deployment" />
        </Roles>
      </Step>
      <Step index="3" >
        <Roles>
          <Role name="AdDnsDhcp" InterfaceType="deployment"/>
        </Roles>
      </Step>
      <Step index="4" >
        <Roles>
          <Role name="AdDnsDhcp" InterfaceType="Configure" />
        </Roles>
      </Step>
      <Step index="5" >
        <Roles>
          <Role name="Storage" InterfaceType="deployment"/>
          <Role name="Compute" InterfaceType="deployment"/>
        </Roles>
      </Step>
      <Step index="6" >
        <Roles>
          <Role name="Storage" InterfaceType="Configure"/>
          <Role name="Compute" InterfaceType="Configure"/>
        </Roles>
      </Step>
```

FIG. 8

```xml
<Action Type="scaleout" Description="Scaleout Storage" >
    <Steps>
        <Step index="1" >
          <Roles>
             <Role name="PhysicalNodes"    InterfaceType="scaleout"/>
          </Roles>
        </Step>
        <Step index="2" >
          <Roles>
             <Role name="Storage"    InterfaceType="scaleout"/>
          </Roles>
        </Step>
        <Step index="3" >
          <Roles>
             <Role name="SCOM" InterfaceType="scaleout-physical"/>
          </Roles>
        </Step>
        <Step index="4" >
          <Roles>
             <Role name="VMM" InterfaceType="scaleout-physical" />
          </Roles>
        </Step>
        <Step index="5" >
          <Roles>
             <Role name="WOSS" InterfaceType="scaleout-physical" />
          </Roles>
        </Step>
    </Steps>
</Action>
```

FIG. 9

Pluggable Model (Interfaces)

- Build Interface
    - Build Product Image
    - Build Sys Prep Image
    - Customize Host Image
    - Customize Guest Image
- Deployment
    - Prerequisite
    - Deploy
    - Configure
- Scale
    - Scale-out
    - Scale-in
    - Scale-up
    - Scale-down
    - Scale out Physical
    - Scale out Guest
- Update
    - PreUpdate
    - Update
    - PostUpdate
    - Update Host agent
    - Update Guest agent
- Validate
    - Validate (Components)
    - TPs (E2E)
- Backup
    - Backup
    - Restore
- Misc
    - FRU
    - Password reset
    - Shutdown
    - Startup

FIG. 10

AUTOMATIC SYSTEM RESPONSE TO EXTERNAL FIELD-REPLACEABLE UNIT (FRU) PROCESS

CROSS-REFERENCE TO RELATED APPLICATIONS

This application is a continuation of U.S. patent application Ser. No. 15/148,528, filed May 6, 2016, which claims the benefit of U.S. Provisional Patent Application Ser. No. 62/267,568, filed Dec. 15, 2015, the disclosures of each of which is hereby incorporated by reference in their entirety.

BACKGROUND

Cloud computing, also known as on-demand computing, is a kind of Internet-based computing, where shared resources, data and information are provided to computers and other devices on-demand. It is a model for enabling ubiquitous, on-demand access to a shared pool of configurable computing resources. Cloud computing and storage solutions provide users and enterprises with various capabilities to store and process their data in third-party data centers. It relies on sharing of resources to achieve coherence and economies of scale, similar to a utility (like the electricity grid) over a network. At the foundation of cloud computing is the broader concept of converged infrastructure and shared services.

Cloud computing data centers tend to have a relatively large amount of computer hardware and software. Often hardware virtualization or platform virtualization with virtual machines that acts like a real computer with an operating system is used. Software executed on these virtual machines is separated from the underlying hardware resources. Virtual machines can be loaded up or removed as needed.

SUMMARY

System management services can discover the addition of new physical devices, take automated actions to provision software (operating system and other related cloud services software components) loaded on the physical devices, and scale out management infrastructure based on the new capacity of the total resources (including the newly added resources). A configuration file can contain the rules for automatic expansion and contraction of the system.

When users/administrators need to take out and replace a failed hardware unit (server, blade chassis, storage units, etc.), the system can automatically detect the removal of the hardware & replacement of the new hardware, and can automatically provision software onto the new node so that the cloud system is back to the original capacity. The management infrastructure can be expanded in addition to adding the device's full capacity to the system.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Embodiments describe a system that allows for the automatic scaling up and scaling down of cloud computing systems. This avoids the problem of the need to manually configure cloud computing devices. The more functions that can be automated at a cloud computing center, the cheaper the cloud computing center can be run.

A configuration file, such as an XML file, can be used to store the rules for controlling the automatic adjustments of the software. Embodiments can also be used to keep track of hardware when it is removed so that this hardware can be reloaded with the same software. Embodiments can allow for the expansion of cloud computing resources as a whole including expansion of hardware, software and software services. A user need only manually remove and add physical computing devices with other changes to the cloud computing center being performed automatically.

Figure 1:
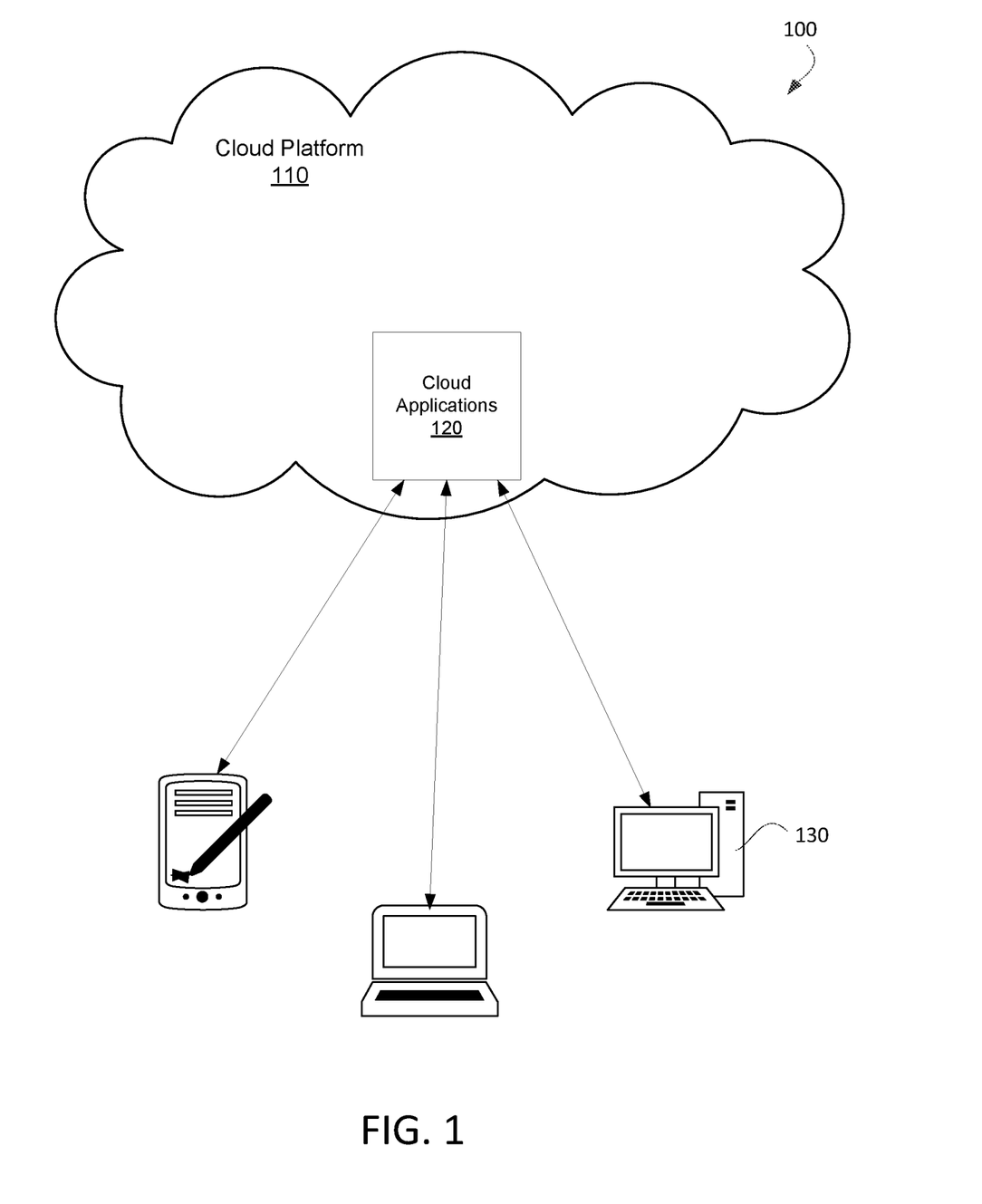
FIG. 1 is a network diagram that illustrates an example cloud computing system.

FIG. 1 is a network diagram that illustrates an example cloud computing system 100. In an embodiment, the computing system 100 shown in FIG. 1 is merely illustrative and is not intended to suggest any limitation as to scope or functionality. Embodiments of the disclosure are operable with numerous other configurations. With reference to FIG. 1, the computing system 100 includes a cloud computing platform 110, cloud applications 120, and client devices 130.

The cloud computing platform 110 is configured to execute cloud applications 120 requested by the client devices 130. The cloud computing platform 110 maintains computing devices that provide virtual machines, which execute the cloud application 120. The cloud computing platform also includes storage resources that store applications and system information. The cloud computing platform 110 connects to the client devices 130 via a communications network, such as a wireless network, local area network, wired network, or the Internet.

The cloud applications 120 are available to the client devices 130. The software executed on the cloud computing platform 110 implements the cloud applications 120. In one embodiment, virtual machines provided by the cloud computing platform 110 execute the cloud applications 120. The cloud applications 120 may include, but are not limited to, editing applications, network management applications, finance applications, or any application requested or developed by the client devices 130. In certain embodiments, some functionality of the cloud application 120 may be executed on the client devices 130.

The client devices 130 are utilized by a user to interact with cloud applications 120 provided by the cloud computing platform 110. The client devices 130, in some embodiments, must register with the cloud computing platform 110 to access the cloud applications 120. Any client device 130 with an account from the cloud computing platform 110 may access the cloud applications 120 and other resources provided in the cloud computing platform 110. The client devices 130 include, without limitation, personal digital assistants, smart phones, laptops, personal computers, gaming systems, set-top boxes, or any other suitable client computing device. The client devices 130 include user and system information storage to store user and system information on the client devices 130. The user information may include search histories, cookies, and passwords. The system information may include internet protocol addresses, cached Web pages, and system utilization. The client devices 130 communicate with the cloud computing platform 110 to receive results from the cloud applications 120.

Accordingly, the computing system 100 is configured with a cloud computing platform 110 that provides cloud applications 120 to the client devices 130. The cloud applications 120 remove the burden of updating and managing multiple local client applications on the client devices 130.

An example cloud computing platform is Microsoft Azure. Microsoft Azure uses a specialized operating system, also called Microsoft Azure, to run its "fabric layer": a cluster hosted at Microsoft's data centers that manage computing and storage resources of the computers and provisions the resources (or a subset of them) to applications running on top of Microsoft Azure.

The cloud computing system can use cloud computing devices and software at a client data center, such as with Microsoft Azure Stack. Moving cloud computing techniques to a company datacenter can provide agility and productivity for application owners, flexibility and control for Information technology (IT) units, and assurance that corporate assets are protected.

Figure 2:
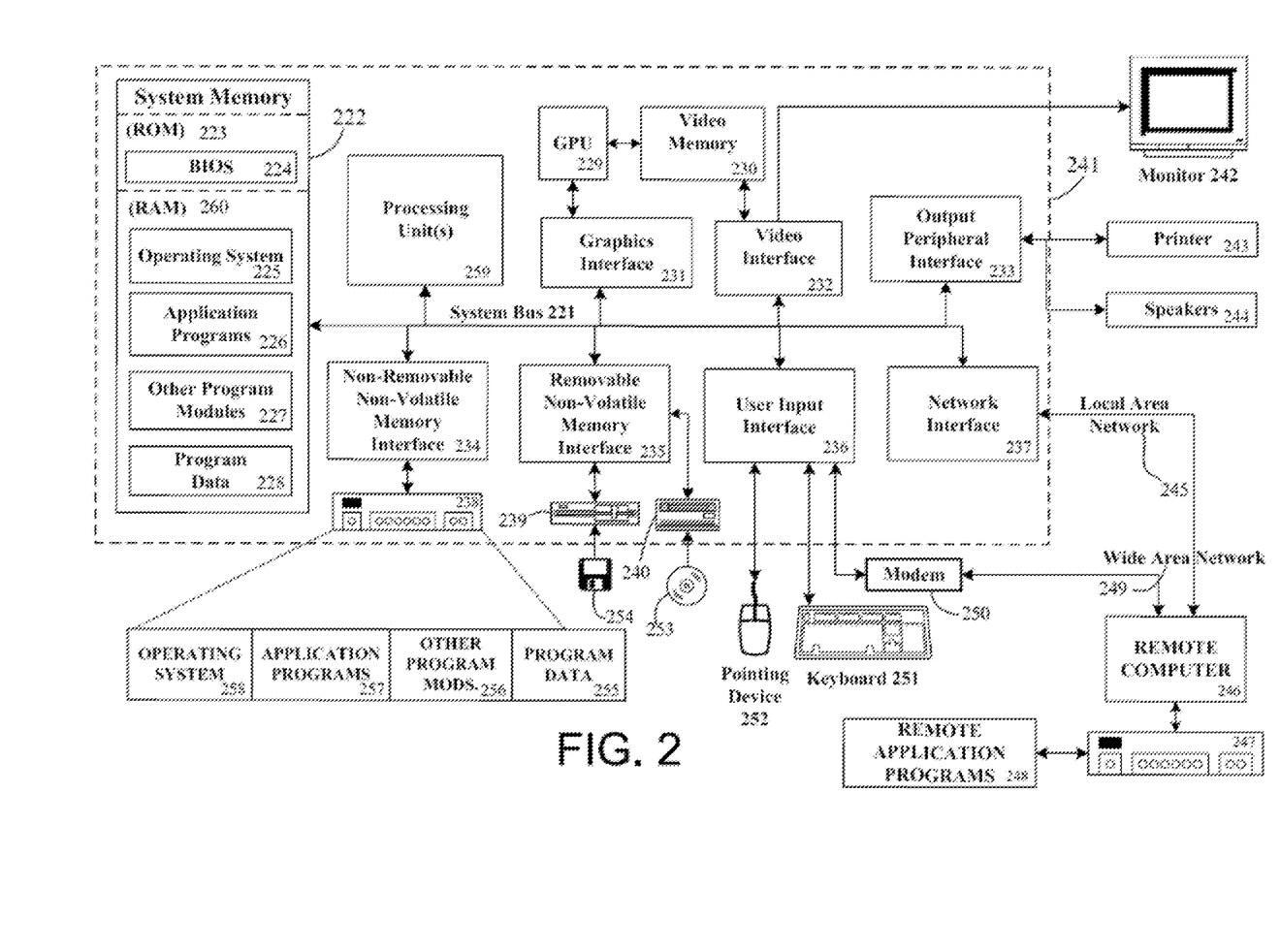
FIG. 2 shows an example non-limiting server or computer that can implement disclosed embodiments.

FIG. 2 shows an example non-limiting server or computer 202 that can implement disclosed embodiments. Such a server or computer can be used to implement cloud computing as well as the methods described below.

In FIG. 2, the computing environment 220 comprises a computer 241, which typically includes a variety of computer readable media. Computer readable media may be any available media that may be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 2 illustrates operating system 225, application programs 226, other program modules 227, and program data 228.

The computer 241 may also include other removable/non-removable, volatile/nonvolatile computer storage media. By way of example only, FIG. 2 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that may be used in the example operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above provide storage of computer readable instructions, data structures, program modules and other data for the computer 241. In FIG. 2, for example, hard disk drive 238 is illustrated as storing operating system 258, application programs 257, other program modules 256, and program data 255. Note that these components may either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, which may take the form of a mouse, trackball, or touch pad, for instance. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232, which may operate in conjunction with a graphics interface 231, a graphics processing unit (GPU) 229, and/or a video memory 229. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2 illustrates remote application programs 248 as residing on memory device 247. It will be appreciated that the network connections shown are illustrative and other means of establishing a communications link between the computers may be used.

Figure 3:
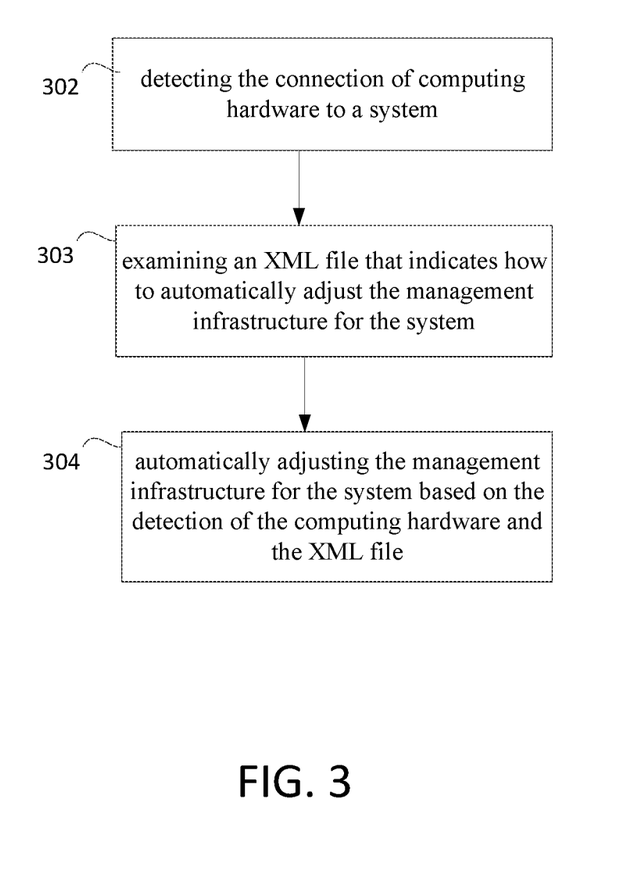
FIGS. 3-5 illustrate methods for use by at least one processor and at least one memory.
Figure 4:
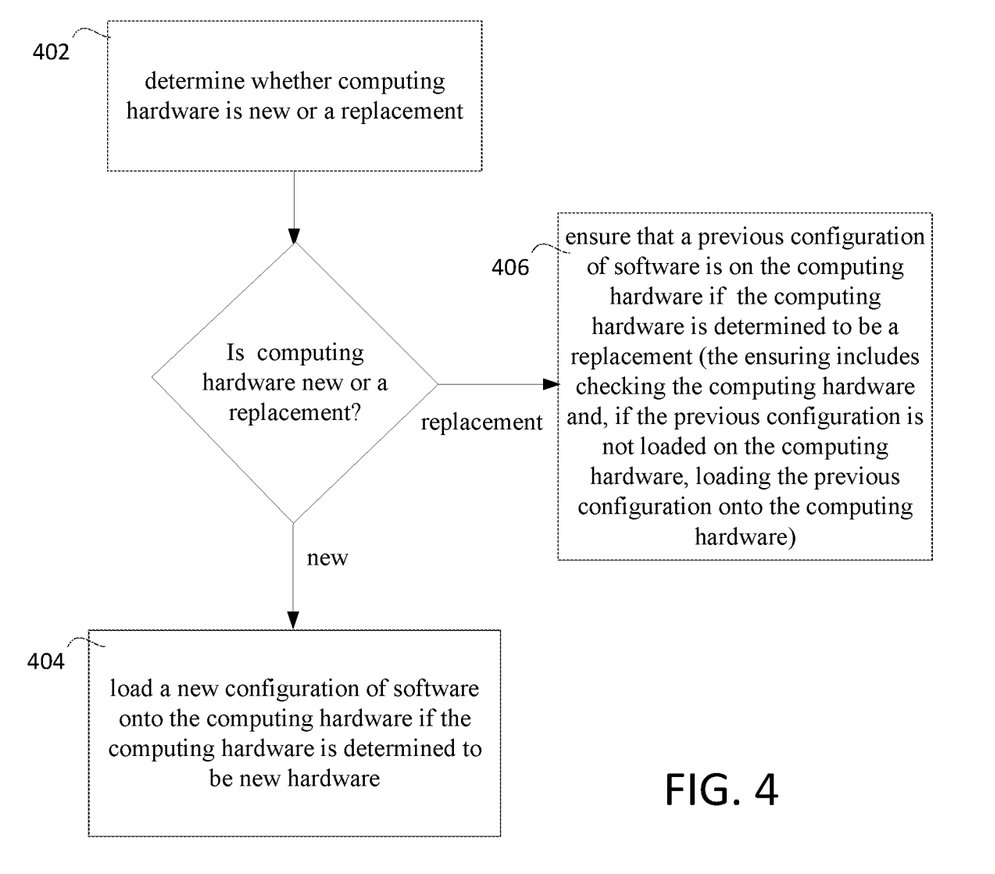
Figure 5:
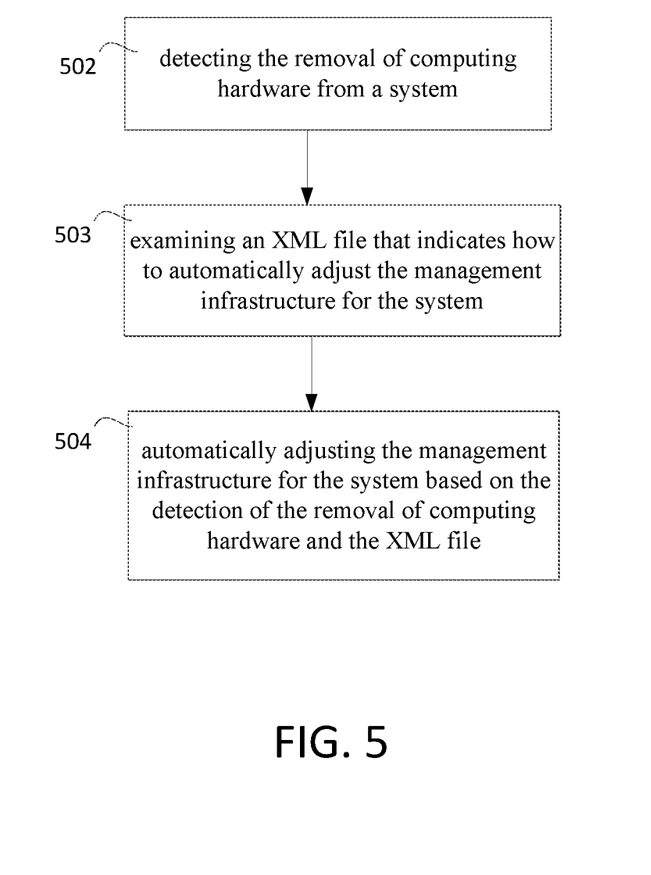

FIGS. 3-5 illustrate methods for use by at least one processor and at least one memory. Computer-executable instructions are stored in the at least one memory which, when executed by the at least one processor can implement the methods in these figures. These methods can be performed by computers in a cloud computing system.

FIG. 3 illustrates an example method.

In step 302, the connection of computing hardware to a system is detected. This can be the adding of a new or replacement server into a cloud computing system. The detection may be performed by sensors, by software that detects the presence of the computing hardware, by the computing hardware alerting the system or by any other method.

In step 303, an XML file that indicates how to automatically adjust the management infrastructure for the system is examined.

In step 304, the management infrastructure for the system is automatically adjusted based on the detection of the computing hardware and the XML file. For example, the computing hardware can automatically loaded with software. Additional management infrastructure nodes can automatically be added to allow the cloud computing system to gracefully scale-up.

The management infrastructure can include software components to manage virtual machine instances. For example, software components can be used to create, edit, start and stop virtual manager instances, and create and view performance and utilization statistics for virtual machine instances.

A configuration file, such as an XML file, can indicate how to automatically adjust the management infrastructure for the system based on the added hardware. As described below, third party software nodes can be adjusted based on the XML file.

The automatic adjustment can include automatically determining whether the hardware is a replacement or is new hardware and adjusting the management infrastructure according to the determination as described with respect to FIG. 4 below.

FIG. 4 illustrates another example method.

In step 402, it is determined whether added computing hardware is new or a replacement. Identifiers for the computing hardware can be compared with identifiers for previously removed hardware.

If the computing hardware is determined to be new hardware, in step 404 a new configuration of software is loaded onto the computing hardware.

If the computing hardware is determined to be a replacement, in step 406 it is ensured that a previous configuration of software is on the computing hardware. For example, a previous configuration may be loaded onto the computing hardware. Alternately, the resident software on the device can be checked to ensure that it is correct. The ensuring step can include checking the computing hardware and, if the previous configuration is not loaded on the computing hardware, loading the previous configuration onto the computing hardware.

The system can detect the intent to replace the hardware by storing information (such as medium access control (MAC) addresses, locations of nodes, specification information and manufactures' names) concerning the hardware. Logic can examine identifiers related to the added hardware to determine whether the hardware is meant to be a replacement. If the hardware is a replacement, time consuming setup and registration processes can be avoided by using a previously registered software image.

The management infrastructure for the system can be automatically adjusted based on the detection of the computing hardware. A configuration file, such as an XML file, can indicate how to automatically adjust the management infrastructure for the system.

FIG. 5 illustrates yet another example method.

In step 502, the removal of computing hardware from a system is detected. This can be the removal of a server from a cloud computing system.

In the step 503, an XML file that indicates how to automatically adjust the management infrastructure for the system is examined.

In step 504, the management infrastructure for the system is automatically adjusted based on the detection of the removal of computing hardware and the XML file. Software management nodes can be automatically removed from the system.

A configuration file, such as an XML file, can indicate how to automatically adjust the management infrastructure for the system based on the removed hardware. Third party software nodes can be adjusted based on the XML file.

Figure 6:
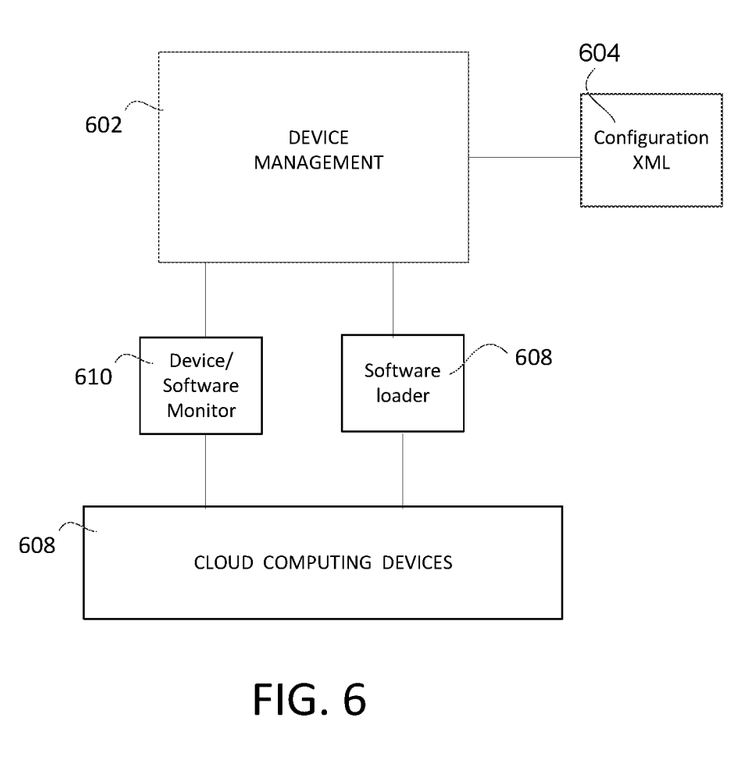
FIG. 6 is a functional diagram that shows a device management functionality that uses Configuration XML.

FIG. 6 is a functional diagram that shows a device management functionality 602 that uses Configuration XML 604. The cloud computing devices 606 can be servers or computers (like that shown in FIG. 2) for use in a cloud computing center. Device/Software Monitor 610 can monitor the cloud computing devices 606 as well as determine the software loaded in the cloud computing devices 606. FIG. 6 depicts a software loader 608.

Figure 7:
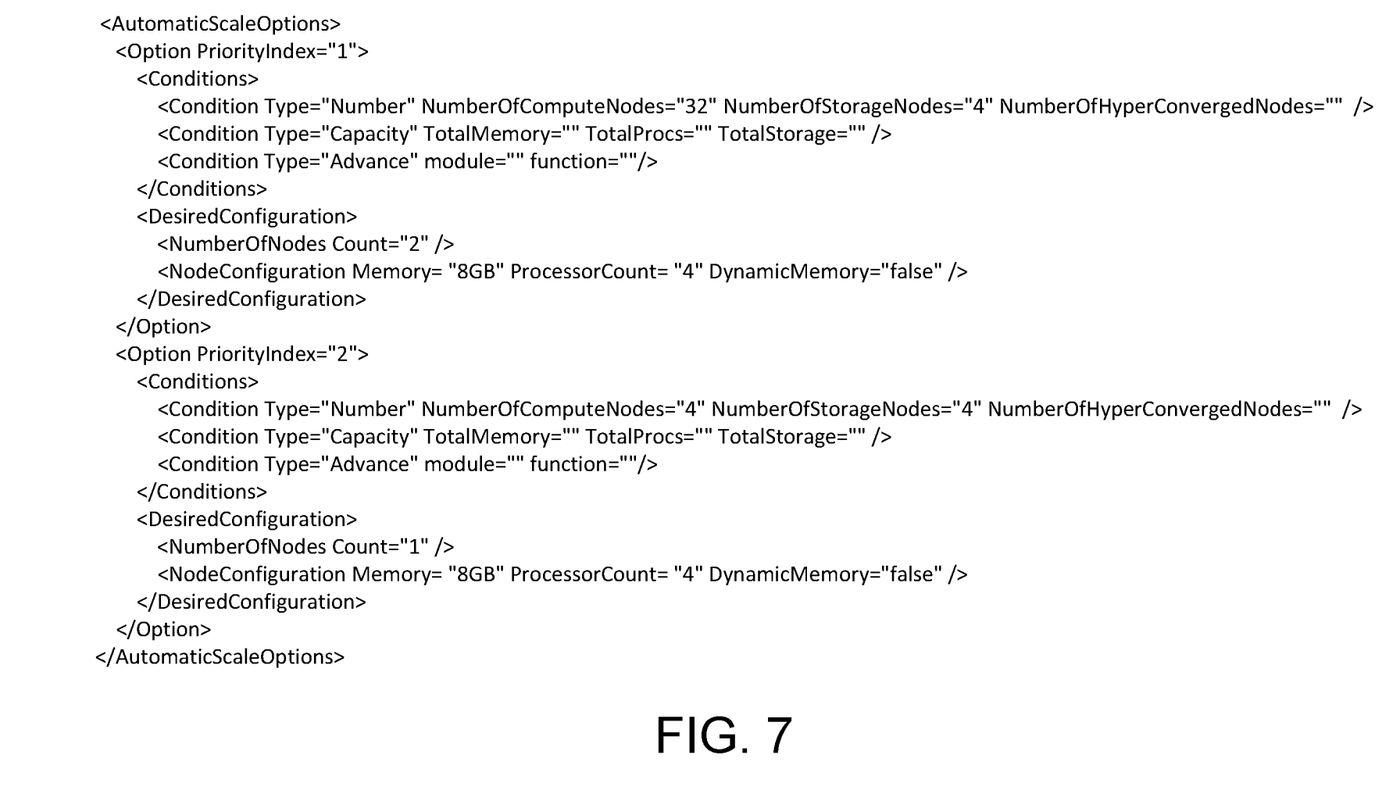
FIGS. 7-9 illustrate example XML fragments that can be used with embodiments.
Figure 8:
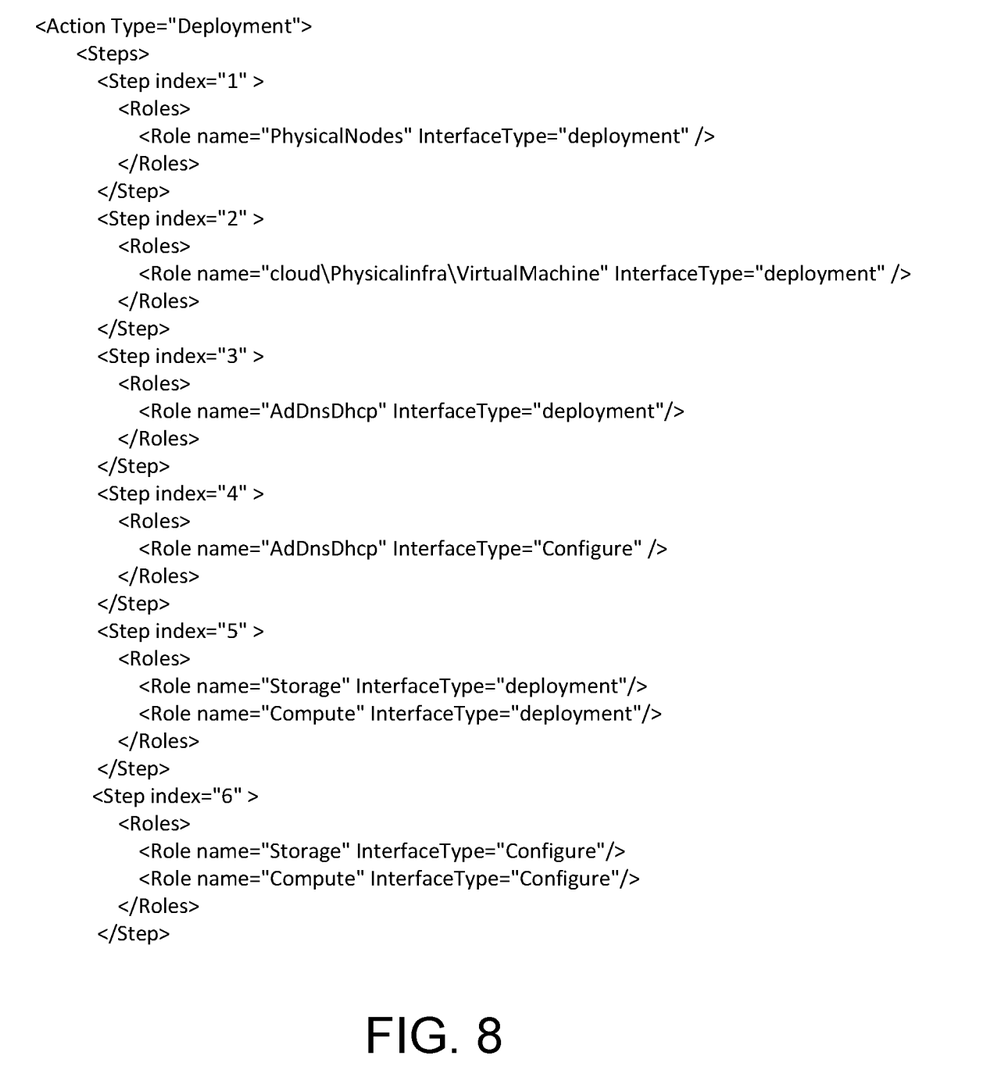
Figure 9:
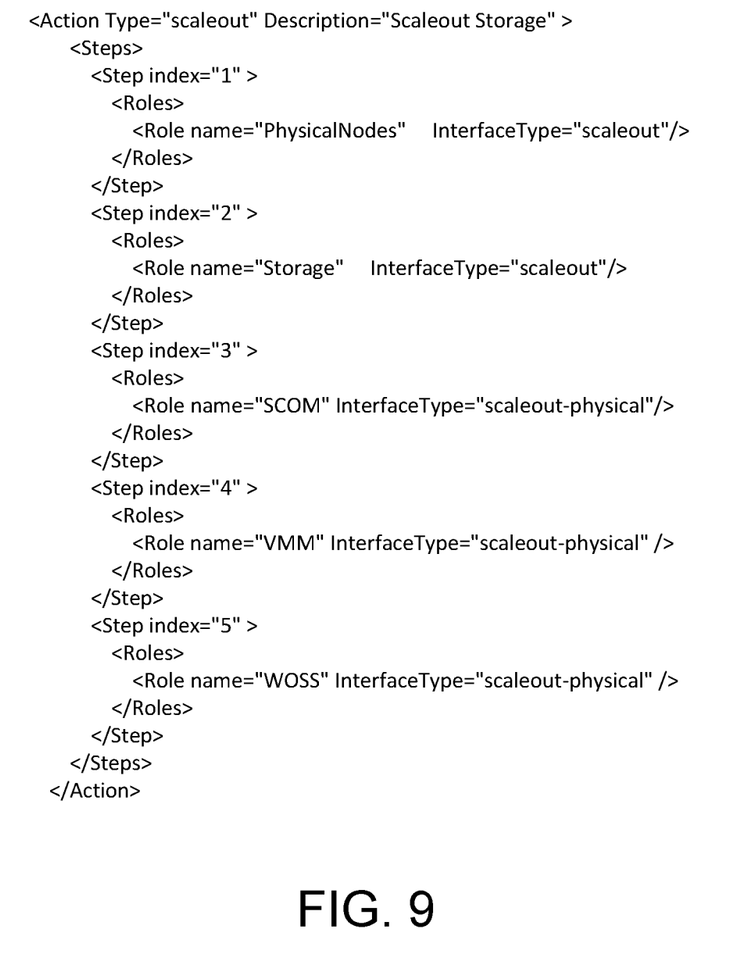

FIGS. 7-9 illustrate example XML fragments that can be used with embodiments. FIG. 7 illustrates a number of options for automatically scaling with multiple priority indexes. FIG. 8 illustrates a deployment example. FIG. 9 illustrates a scaleout example.

The XML can be used to define the desired configurations for automatically scaling up and scaling in the cloud computing infrastructure. A certain number of physical devices can result in the use of a predetermined number of virtual machines, storage nodes and management infrastructure nodes.

As physical nodes are added, virtual machines, storage nodes and management infrastructure nodes can be added as well. As physical nodes are removed, virtual machines, storage nodes and management infrastructure nodes can be removed.

In one embodiment, a buffer time can be used to delay the scaling down of virtual machines, storage nodes and management infrastructure nodes. For example a buffer time of two days can be used. This can avoid the overhead involved in scaling down and scaling up when replacement hardware is added back to the cloud computing center.

Typically, cloud computing centers are highly available services with a certain amount of reserve capacity. The cloud computing system thus may not need not deal with removed hardware immediately. The cloud computing system can get back this reserve capacity once replacement hardware is added.

The use of a configuration file can allow the users and administrators to easily configure the automatic processes. Further, the configuration file can be used to allow third party software vendors to hook into the automatic processes described above.

Figure 10:
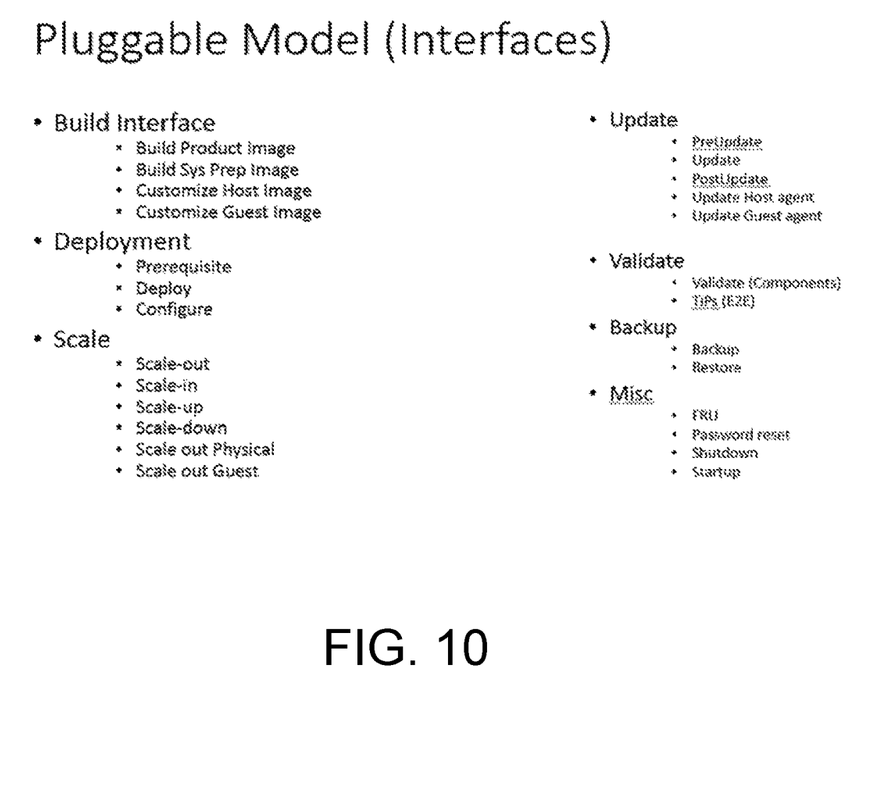
FIG. 10 shows example Application Programming Interfaces (APIs) that third parties can implement to adjust the cloud computing system.

FIG. 10 shows example Application Programming Interfaces (APIs) that third parties can implement to adjust the cloud computing system. Calls to these APIs can be inserted in the configuration file to allow third party nodes to be added and removed. Other actions can also be triggered.

A variety of APIs can be used. Build can include "build product image", "build sys prep image", "customize host image", and "customize guest image" APIs. Deployment can include "prerequisite", "deploy", and "configure" APIs. Scale can include "scale-out", "scale-in", "scale-up", "scale-down", "scale out physical" and "scale out guest" APIs. Update can include "preupdate", "update", "postupdate", "update host agent" and "update guest agent" APIs. Validate can include "validate" and "TiPs" APIs. Backup can include "backup" and "restore" APIs. Miscellaneous APIs can include "FRU", "password reset", "shutdown" and "startup".

It should be appreciated that any software components described herein may, when loaded into a processor and executed, transform the processor from a general-purpose computing system into a special-purpose computing system customized to facilitate the functionality presented herein. The processor may be constructed from any number of transistors or other discrete circuit elements, which may individually or collectively assume any number of states. More specifically, the processor may operate as a finite-state machine, in response to executable instructions contained within the software modules disclosed herein. These processor-executable instructions may transform the processor by specifying how the processor transitions between states, thereby transforming the transistors or other discrete hardware elements constituting the processor.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture in order to store and execute the software components presented herein. It also should be appreciated that the architecture may include other types of computing devices, including hand-held computers, embedded computer systems, smartphones, PDAs, and other types of computing devices known to those skilled in the art. It is also contemplated that the architecture may not include all of the components shown in the figures, may include other components that are not explicitly shown in the figures, or may utilize an architecture completely different from that shown the figures.

Alternatively, or in addition, the functionally described herein may be performed, at least in part, by one or more hardware logic components. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Computer-readable storage media may provide storage for instructions for the one or more processors. Although the description of computer-readable storage media contained herein refers to a mass storage device, such as a hard disk or CD-ROM drive, it should be appreciated by those skilled in the art that computer-readable media may be any available storage media.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which may be used to store the desired information and instructions. For purposes of this specification and the claims, the phrase "computer-readable storage medium" and variations thereof, does not include waves, signals, and/or other transitory and/or intangible communication media.

Although the subject matter presented herein has been described in language specific to computer structural features, methodological and transformative acts, specific computing machinery, and computer-readable storage media, it is to be understood that the methods and devices defined in the appended claims is not necessarily limited to the specific features, acts, or media described herein. Rather, the specific features, acts, and mediums are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

The invention claimed is:

1. A method performed by a computing system, comprising:
   detecting a connection of a subject computing hardware to the computing system;
   in response to detecting the connection of the subject computing hardware to the computing system, determining whether the subject computing hardware is new hardware or replacement hardware that was previously connected to the computing by comparing an identifier for the subject computing hardware with one or more identifiers for computing hardware previously connected to the computing system, the one or more identifiers stored within at least one memory device of the computing system;

automatically adjusting the management infrastructure for the computing system based on detecting the connection of the subject computing hardware to the computing system and rules of a configuration file stored in the at least one memory device for controlling the automatic adjustment of a management infrastructure for the computing system, wherein automatically adjusting the management infrastructure includes:

(i) in response to determining that the subject computing hardware is new hardware, automatically loading a new configuration of software from the computing system onto the subject computing hardware based on the rules of the configuration file, and (ii) in response to determining that the subject computing hardware is replacement hardware, automatically loading a previous configuration of software of the subject computing hardware from the computing system onto the subject computing hardware based on the rules of the configuration file, the previous configuration differing from the new configuration and being the same configuration of software that was previously on the replacement hardware.

2. The method of claim 1, wherein the one or more identifiers stored within the at least one memory device include a medium access control (MAC) address.

3. The method of claim 1, wherein the one or more identifiers stored within the at least one memory device include a manufacturer's name.

4. The method of claim 1, wherein the previous configuration of software includes a previously registered software image.

5. The method of claim 1, wherein automatically loading the new configuration of software onto the subject computing hardware includes initiating a setup process or a registration process.

6. The method of claim 1, wherein the configuration file includes an XML file.

7. The method of claim 1, further comprising:
scaling up the computing system by adding a virtual machine via the subject computing hardware detected as being connected to the computing system.

8. The method of claim 1, further comprising:
scaling up the computing system by adding a storage node via the subject computing hardware detected as being connected to the computing system.

9. The method of claim 1, further comprising:
scaling up the computing system by adding a management infrastructure node via the subject computing hardware detected as being connected to the computing system.

10. The method of claim 1, wherein the computing system includes a server system of a data center.

11. A computing system, comprising:
one or more processors;
one or more storage devices having instructions stored thereon executable by the one or more processors to:
detect a connection of a subject computing hardware to the computing system;
in response to detecting the connection of the subject computing hardware to the computing system, determine whether the subject computing hardware is new hardware or replacement hardware that was previously connected to the computing by comparing an identifier for the subject computing hardware with one or more identifiers for computing hardware previously connected to the computing system, the one or more identifiers stored within at least one memory device of the computing system;

automatically adjust the management infrastructure for the computing system based on detecting the connection of the subject computing hardware to the computing system and rules of a configuration file stored in the at least one memory device for controlling the automatic adjustment of a management infrastructure for the computing system, wherein the management infrastructure is automatically adjusted by:

(i) in response to determining that the subject computing hardware is new hardware, automatically load a new configuration of software from the computing system onto the subject computing hardware based on the rules of the configuration file, and (ii) in response to determining that the subject computing hardware is replacement hardware, automatically load a previous configuration of software of the subject computing hardware from the computing system onto the subject computing hardware based on the rules of the configuration file, the previous configuration differing from the new configuration and being the same configuration of software that was previously on the replacement hardware.

12. The computing system of claim 11, wherein the one or more identifiers stored within the at least one memory device include a medium access control (MAC) address.

13. The computing system of claim 11, wherein the one or more identifiers stored within the at least one memory device include a manufacturer's name.

14. The computing system of claim 11, wherein the previous configuration of software includes a previously registered software image.

15. The computing system of claim 11, wherein automatically loading the new configuration of software onto the subject computing hardware includes initiating a setup process or a registration process.

16. The computing system of claim 11, wherein the configuration file includes an XML file.

17. The computing system of claim 11, wherein the instructions are further executable by the one or more processors to:
scale up the computing system by adding a virtual machine via the subject computing hardware detected as being connected to the computing system.

18. The computing system of claim 11, wherein the instructions are further executable by the one or more processors to:
scale up the computing system by adding a storage node or a management infrastructure node via the subject computing hardware detected as being connected to the computing system.

19. The computing system of claim 11, wherein the computing system includes a server system of a data center.

20. A computing system, comprising:
one or more processors;
one or more storage devices having instructions stored thereon executable by the one or more processors to:
detect a connection of a subject computing hardware to the computing system;

in response to detecting the connection of the subject computing hardware to the computing system, determine whether the subject computing hardware is new hardware or replacement hardware that was previously connected to the computing by comparing an identifier for the subject computing hardware with one or more identifiers for computing hardware previously connected to the computing system, the one or more identifiers stored within at least one memory device of the computing system;

automatically adjust the management infrastructure for the computing system based on detecting the connection of the subject computing hardware to the computing system and rules of a configuration file stored in the at least one memory device for controlling the automatic adjustment of a management infrastructure for the computing system, the rules of the configuration file identifying a node type for the subject computing hardware as one or more of a virtual machine node, a storage node, or a management infrastructure node, wherein the management infrastructure is automatically adjusted by:

(i) in response to determining that the subject computing hardware is new hardware, automatically load a first configuration of software from the computing system onto the subject computing hardware based on the rules of the configuration file, including initiating a setup process or a registration process for the subject computing hardware for the identified node type, and (ii) in response to determining that the subject computing hardware is replacement hardware, automatically load a second configuration of software of the subject computing hardware from the computing system onto the subject computing hardware for the identified node type based on the rules of the configuration file, the second configuration of software differing from the first configuration of software and being the same configuration of software that was previously on the replacement hardware.

* * * * *